United States Patent [19]

Tackett

[11] Patent Number: 4,708,205

[45] Date of Patent: Nov. 24, 1987

[54] BRINE TOLERANT POLYMER FOR OIL RECOVERY APPLICATIONS

[75] Inventor: James E. Tackett, Littleton, Colo.

[73] Assignee: Marathon Oil Company, Findlay, Ohio

[21] Appl. No.: 813,181

[22] Filed: Dec. 24, 1985

[51] Int. Cl.$^4$ .............................................. E21B 43/16
[52] U.S. Cl. ................................... 166/273; 166/274; 166/275; 166/305.1; 252/8.554; 525/329.4; 525/54.11; 525/379
[58] Field of Search ............ 166/273, 274, 275, 305.1; 252/8.554

[56] References Cited

U.S. PATENT DOCUMENTS

| | | | |
|---|---|---|---|
| 3,880,764 | 4/1975 | Donham | 252/8.5 |
| 4,268,403 | 5/1981 | Buckman et al. | 252/8.554 |
| 4,341,265 | 7/1982 | Blair, Jr. | 252/8.554 |
| 4,430,481 | 2/1984 | Hunter | 252/8.554 |
| 4,485,021 | 11/1984 | Purcell et al. | 252/8.554 |
| 4,561,502 | 12/1985 | Norton et al. | 252/8.554 |

*Primary Examiner*—Joseph L. Schofer
*Assistant Examiner*—Bernard Lipman
*Attorney, Agent, or Firm*—Jack L. Hummel; Rodney F. Brown

[57] ABSTRACT

A beta-alanine-type branched partially hydrolyzed polyacrylamide is added to an aqueous injection fluid to increase the viscosity of the fluid. The polymer resists plugging of the wellbore face and/or matrix pores and is brine tolerant when injected into a subterranean hydrocarbon-bearing formation.

8 Claims, No Drawings

BRINE TOLERANT POLYMER FOR OIL RECOVERY APPLICATIONS

BACKGROUND OF THE INVENTION

Technical Field

The invention relates to a brine tolerant polymer composition and a process for producing and using the same and more particularly to a polymer composition used as a viscosifying agent, which is relatively insensitive to saline connate water in a subterranean oil-bearing formation.

Description of Related Art

Polymers are commonly used in oil recovery applications as viscosifying agents for fluids injected into subterranean oil-bearing formations. Applications for fluids having polymer enhanced viscosity include oil displacement in water flooding, mobility control in surfactant flooding, and permeability reduction of thief zones.

One method of increasing the viscosity of a fluid is to add extremely high molecular weight polymers to the fluid. A problem concomitant to the use of high molecular weight polymers is that the polymers often filter out the injected fluid onto the wellbore face or in the matrix pores, causing undesirable face plugging and permeability reduction. An additional problem is that high molecular weight polymers are less brine tolerant than lower molecular weight polymers, i.e., high molecular weight polymers ball up in brine, diminishing the viscosity of the polymer-containing fluid.

The art recognizes brine tolerant polymers for oil recovery applications. For example, U.S. Pat. No. 3,880,764 to Donham describes a drilling fluid composition containing a polymer and additives which render the polymer relatively brine tolerant. However, an unfilled need exists for other brine tolerant compositions useful in oil displacement flooding and other above-described applications.

SUMMARY OF THE INVENTION

The present invention provides a brine tolerant low molecular weight polymer composition which effectively increases the viscosity of a fluid containing the polymer. The polymer composition is a partially hydrolyzed polyacrylamide (PHPA) wherein one or more of the amide groups of the PHPA have a beta-alanine-type constituent added thereto.

The composition of the present invention may be produced by contacting a base such as sodium hydroxide with a mixture containing unhydrolyzed polyacrylamide and acrylamide monomer. The base reacts with the monomer to form beta-alanine-type constituents and hydrolyzes a portion of the amide groups on the polyacrylamide to carboxylate groups. A limited number of the beta-alanine-type constituents add on to one or more of the amide groups on the PHPA to produce relatively low molecular weight beta-alanine-type branches on the PHPA.

The beta-alanine-type branched PHPA of the present invention substantially increases the viscosity of an aqueous fluid when added thereto without increasing the potential for face plugging in the formation. The branched PHPA is also significantly more brine tolerant than a corresponding straight-chain PHPA.

The benefits are believed attributable to the following phenomena. Generally, the viscosity enhancing capability of commonly used straight-chain PHPA is a function of its molecular weight, i.e., the viscosity of a polymer solution increases as the molecular weight of the polymer dissolved therein increases. In contrast, the viscosity enhancing properties of the present branched polymer are a direct result of branching rather than molecular weight. By placing a limited number of branches on a PHPA molecule, the same degree of viscosity enhancement is achieved with a lower molecular weight branched PHPA than with a higher molecular weight straight-chain PHPA. Furthermore, because of its lower molecular weight, the branched polymer is substantially less likely to plug the matrix pores and wellbore face than the higher molecular weight straight-chain polymer. Finally, the branched polymer is significantly more brine tolerant than the straight-chain polymer because the branching apparently minimizes balling up of the polymer on itself in the presence of a brine.

DESCRIPTION OF THE PREFERRED EMBODIMENTS

The present invention relates to a brine tolerant polymer composition and a method of making and using the same in oil recovery applications. The polymer composition is a partially hydrolyzed polyacrylamide having branched beta-alanine-type constitutents. The polymer molecule has the following formula:

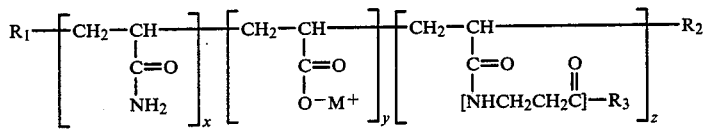

where:
- x is the fraction of amide groups in the molecule and has a value between about 0.9 and 0.5;
- y is the fraction of carboxylate groups in the molecule and has a value between about 0.1 and 0.5 which represents the degree of hydrolysis of the PHPA molecule;
- z is the fraction of branched groups containing the beta-alanine-type constituents in the molecule and has a value greater than 0 and less than about 0.01;

- $R_1$ and $R_2$ are either repeating amide, carboxylate, or branched groups in the stated fractional proportions or a chain terminating hydrogen ion;
- $M^+$ is the cation of the hydrolyzing salt, for example, $NH_4^+$, $K^+$, $Na^+$, etc; and
- $R_3$ is $NH_2$, $O^-M^+$, or a repeating beta-alanine-type constituent.

It is preferable that the polymer has at least one branched betaalanine constituent along the chain to increase the viscosity of a fluid containing the polymer. It is further preferable that the number of branched groups in the molecule does not exceed 1% of the total number of groups making up the polymer molecule to avoid polymer plugging of the formation. The degree of hydrolysis of the polymer is about 10 to 50% and preferably about 25 to 35%. The average molecular weight range of the polymer is about 2 million to about 10 million and preferably about 4 million to about 6 million. The molecular weight of the branching constituents on the polymer is only a small portion of the total molecular weight of the polymer. Each branch usually has a molecular weight on the order of about 50 to about 300 although larger branches may be possible with significant repetition of the beta-alanine-type group.

Several alternatives are available for producing the branched PHPA. In the preferred method, a polyacrylamide is formed in an aqueous solution by polymerizing an acrylamide monomer substantially to completion according to methods known in the art. The resulting polyacrylamide solution generally has a concentration from about 3 to about 10% by weight. The polyacrylamide solution may be diluted to a concentration less than 3% by weight to facilitate the subsequent process steps.

Thereafter an amount of acrylamide monomer and a base such as sodium hydroxide are added to the polyacrylamide solution. The weight ratio of polymer to monomer in the resulting solution is from about 20:1 to about 6:1 and preferably about 13:1 to about 10:1. A portion of the base reacts with the polyacrylamide, hydrolyzing 10 to 50% of the amide groups. The remainder of the base reacts with the monomer, forming beta-alanine-type constituents. The general formula of the beta-alanine-type constituents is:

wherein $X_1$ is $NH_2$, OH, or an amide group and $X_2$ is $NH_2$ or $O^-M^+$. The beta-alanine-type constituent may also be present in solution in polymerized form, wherein the general formula of the constituent is repeated one or more times.

The beta-alanine-type constituents add onto one or more of the amide groups of the PHPA resulting in the branched PHPA. The remainder of beta-alanine-type constituents are left in solution.

The hydrolysis and addition reactions are carried out at a temperature range from ambient to about 71° C. and preferably in a narrow range around 55° C.

This method is preferred because it is relatively easy to control the amount of monomer present in solution which subsequently determines the critical degree of beta-alanine branching on the PHPA molecule.

In an alternative embodiment, the branched polymer is produced by partially polymerizing an acrylamide monomer. The polymerization reaction is terminated before the monomer reacts substantially to completion such that the weight ratio of polymer to excess monomer remaining in the polyacrylamide solution is from about 20:1 to 6:1 and preferably about 12:1 to 8:1. Partial polymerization can be achieved by limiting the amount of catalyst to the polymerization reaction, adding a free radical inhibitor to the reaction solution at an appropriate stage of the reaction, or cooling the reaction at an appropriate stage. Thereafter a base is added to the solution to partially hydrolyze the polyacrylamide and initiate beta-alanine-type branching of the PHPA.

In another embodiment, PHPA is produced according to methods known in the art and a base and monomer are added to the PHPA solution resulting in branched PHPA. In yet another method, a pre-manufactured beta-alanine-type constituent and a base are added directly to a polyacrylamide or PHPA solution to produce the branched PHPA.

The beta-alanine-type branched PHPA solution produced according to one of the above-described embodiments is diluted with an aqueous diluent to a desired concentration which is determined by its anticipated use. For example, the PHPA solution may be diluted to 1000 ppm with a field produced brine for injection into a subterranean hydrocarbon-bearing formation as an oil displacement fluid. Alternatively, the solution may be diluted for use as a mobility buffer in a micellar flood.

The aqueous solution containing the beta-alanine-type branched PHPA is more brine tolerant than straight-chain PHPA. Brine tolerance is defined as the ability of a viscous polymer solution to remain at or near its original viscosity when contacting a brine solution.

It is believed that the viscosity enhancing character of high molecular weight straight-chain PHPA is produced by intermolecular entangling of the long polymer chains. However, the ions in a brine cause a straight-chain PHPA molecule to ball up on itself. This reduces the viscosity of a PHPA solution because the balled up molecules are less capable of intermolecular entanglement. A limited number of beta-alanine-type branches on the PHPA chain maintains or even improves the viscosity enhancing character of PHPA by hindering intramolecular balling while facilitating intermolecular entangling. The degree of branching is limited to the preferred range because too much branching causes the polymer to plug the wellbore face and/or the matrix pores when injected into a formation.

The beneficial effect of beta-alanine-type branching is more pronounced when applied to lower molecular weight PHPA than higher molecular weight PHPA because lower molecular weight PHPA has a higher proportion of branches relative to the overall polymer size. A beneficial improvement in brine tolerance may also be realized from the presence of residual beta-alanine-type constituents in the polymer solution independent of their branching function. Beta-alanine-type constituents in a brine/polymer solution may associate with a portion of the cations in the brine resulting in fewer cations available to react with and ball up the polymer molecules.

The following examples illustrate the composition of the present invention and its method of manufacture. The examples are not to be construed as limiting the scope of the invention.

EXAMPLE 1

A 6% by weight polyacrylamide solution is prepared having a residual monomer concentration of 700 ppm. The molecular weight of the polymer is 5 million. The solution is diluted with fresh water to a polymer concentration of 1% by weight. Thereafter the polymer solution is divided into a series of samples and differing weight ratios of acrylamide monomer are added thereto. Sufficient sodium hydroxide is also added to each sample to hydrolyze 30% of the acrylamide groups on the polymer. The samples are reacted to completion at 55° C. The samples are then diluted with an NaCl solution to a polymer concentration of 500 ppm and an NaCl concentration of 500 ppm. The viscosity of each dilute sample is measured at 22° C. The results are summarized below in Table 1.

TABLE 1

| Weight Ratio of Polymer to Monomer in Initial Sample | Viscosity (centipoise) |
|---|---|
| 86:1 (no additional monomer) | 30 |
| Greater than 12:1 | 30 |
| Equal to or less than 12:1 | 34 |

The results indicate that viscosity improvement caused by the formation of branched PHPA in a brine is a discontinuous step function of the weight ratio of polymer to monomer. No benefit is realized in all samples wherein the weight ratio of polymer to monomer is greater than 12:1. An approximate 13% improvement in viscosity is observed where the polymer to monomer ratio in the sample is 12:1 or less. However, little improvement is observed by decreasing the polymer to monomer ratio substantially below 12:1 in the samples. Therefore, the optimum ratio of polymer to monomer appears to be around 12:1 for the present reaction conditions.

EXAMPLE 2

A 7.5% by weight polyacrylamide solution is prepared, having a residual monomer concentration of 900 ppm. The molecular weight of the polymer is 10 million. The solution is diluted with fresh water to a polymer concentration of 1% by weight. Thereafter the polymer solution is divided into a series of samples and treated in the same manner as Example 1. The results are summarized in Table 2 below.

TABLE 2

| Weight Ratio of Polymer to Monomer in Initial Sample | Viscosity (centipoise) |
|---|---|
| 83:1 (no monomer added) | 30 |
| Greater than 11:1 | 30 |
| Equal to or less than 11:1 | 35 |

The same discontinuous step function of Example 1 which relates the polymer to monomer weight ratio to viscosity applies within experimental error to the results of Example 2, although a higher molecular weight polymer is being used.

EXAMPLE 3

Samples of polymer solutions are prepared and treated in the manner of Example 1 wherein the molecular weight of the polymer is 5 million except that the samples have a polymer concentration of 1000 pmm and an NaCl concentration of 20,000 ppm. The results are summarized in Table 3 below.

TABLE 3

| Weight Ratio of Polymer to Monomer in Initial Sample | Viscosity (centipoise) |
|---|---|
| Greater than 12:1 | 6.9 |
| Equal to or less than 12:1 | 13 |

The data of Table 3 indicate that the polymer solution with optimal branching is substantially more brine tolerant than the untreated or insufficiently branched polymer solution.

EXAMPLE 4

Samples of polymer solutions are prepared and treated in the manner of Example 3 except that the molecular weight of the polymer is 10 million. The results are summarized in Table 4 below.

TABLE 4

| Weight Ratio of Polymer to Monomer in Initial Sample | Viscosity (centipoise) |
|---|---|
| Greater than 11:1 | 11 |
| Equal to or less than 11:1 | 14 |

Comparing the data of Table 3 and Table 4, it appears that the branching is more effective in improving the brine tolerance of a lower molecular weight than a higher molecular weight polymer. This supports the belief that higher molecular weight polymers do not benefit as much from branching as low molecular weight polymers because the high molecular weight polymers have more opportunities to entangle even with branching due to their extended length.

While the foregoing embodiments of the invention have been described and shown, it is understood that the alternatives and modifications, such as those suggested and others, may be made thereto and follow in the scope of the invention.

I claim:

1. A process for increasing the viscosity of an aqueous partially hydrolyzed polyacrylamide solution and injecting said solution having increased viscosity into a subterranean hydrocarbon-bearing formation to facilitate the recovery of hydrocarbons therefrom comprising:

(a) providing said solution with a branched polymer in an amount sufficient to increase the viscosity of said solution wherein said branched polymer has the general formula:

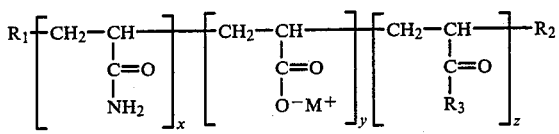

where:
   x is a fraction of amide groups in the branched polymer and has a value between about 0.9 and 0.5;
   y is a fraction of carboxylate groups in the branched polymer and has a value between about 0.1 and 0.5;
   z is a fraction of branched groups in the branched polymer and has a value greater than 0 and less than about 0.01;
   $R_1$ and $R_2$ are either repeating amide, carboxylate, or branched groups in the stated fractions of x, y and z or a chain terminating hydrogen ion;
   $R_3$ is a branching constituent selected from the group consisting of

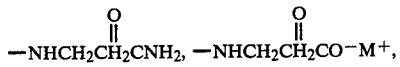

and dimers and trimers thereof; and
   $M^+$ is a cation of a hydrolyzing salt;

(b) injecting said solution containing said branched polymer and said partially hydrolyzed polyacrylamide into a wellbore in fluid communication with said subterranean hydrocarbon-bearing formation; and (c) displacing said solution into said formation to facilitate recovery of hydrocarbons therefrom.

2. The process of claim 1 wherein said solution is an oil displacement fluid.

3. The process of claim 1 wherein said solution is a mobility buffer.

4. The process of claim 1 wherein said solution is a brine.

5. The process of claim 1 wherein $M^+$ is selected from the group consisting of $Na^+$, $K^+$ and $NH_4^+$.

6. The process of claim 1 wherein y is about 0.25 to about 0.35 and x is about 0.65 to about 0.75.

7. The process of claim 1 wherein said solution is a permeability reducing agent for conformance treatment.

8. The process of claim 1 wherein said partially hydrolyzed polyacrylamide solution is provided with said branched polymer by adding a branching compound, having the general formula:

$$X_1CH_2CH_2\overset{\overset{O}{\|}}{C}X_2$$

where:
$X_1$ is selected from the group consisting of $NH_2$, OH, and an amide group, and
$X_2$ is selected from the group consisting of $NH_2$ and $O^-M^+$, to said solution and reacting said partially hydrolyzed polyacrylamide with said brancing compound in said solution to form said branched polymer.

* * * * *

UNITED STATES PATENT AND TRADEMARK OFFICE
CERTIFICATE OF CORRECTION

PATENT NO. : 4,708,205

DATED : November 24, 1987

INVENTOR(S) : James E. Tackett

It is certified that error appears in the above-identified patent and that said Letters Patent is hereby corrected as shown below:

Col. 1, line 23: After "filter out" insert --of--.
Col. 2, line 61: Delete "betaalanine" and insert --beta-alanine--.
Col. 8, line 15: Delete "brancing" and insert --branching--.

Signed and Sealed this

Twenty-third Day of April, 1991

Attest:

HARRY F. MANBECK, JR.

*Attesting Officer*     *Commissioner of Patents and Trademarks*